(12) United States Patent
Park et al.

(10) Patent No.: US 9,167,222 B2
(45) Date of Patent: Oct. 20, 2015

(54) METHOD AND APPARATUS FOR PROVIDING AND PROCESSING 3D IMAGE

(75) Inventors: Hong-seok Park, Anyang-si (KR);
Jae-jun Lee, Suwon-si (KR);
Houng-sog Min, Ansan-si (KR);
Dae-jong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 13/161,142

(22) Filed: Jun. 15, 2011

(65) Prior Publication Data

US 2012/0086773 A1    Apr. 12, 2012

(30) Foreign Application Priority Data

Oct. 11, 2010   (KR) .................. 10-2010-0098829

(51) Int. Cl.
*H04N 13/00*    (2006.01)
*G06K 9/00*    (2006.01)
*H04N 19/597*   (2014.01)

(52) U.S. Cl.
CPC ....... *H04N 13/0007* (2013.01); *H04N 13/0055* (2013.01); *H04N 13/0059* (2013.01); *H04N 13/0066* (2013.01); *H04N 19/597* (2014.11)

(58) Field of Classification Search
CPC .......... H04N 13/0007; H04N 13/0055; H04N 13/0059; H04N 13/0066
See application file for complete search history.

(56) References Cited

U.S. PATENT DOCUMENTS

| | | | |
|---|---|---|---|
| 6,160,574 A * | 12/2000 | Oba et al. ........................ | 348/46 |
| 2002/0028014 A1* | 3/2002 | Ono .............................. | 382/154 |
| 2004/0120396 A1* | 6/2004 | Yun et al. ................ | 375/240.01 |
| 2006/0002465 A1* | 1/2006 | Raveendran et al. .... | 375/240.01 |
| 2006/0126919 A1* | 6/2006 | Kitaura et al. ................ | 382/154 |
| 2007/0236514 A1* | 10/2007 | Agusanto et al. ............. | 345/646 |
| 2008/0125219 A1* | 5/2008 | Williams et al. ................ | 463/31 |
| 2010/0110162 A1* | 5/2010 | Yun et al. ........................ | 348/42 |
| 2010/0303444 A1* | 12/2010 | Sasaki et al. .................. | 386/248 |

* cited by examiner

*Primary Examiner* — Dave Czekaj
*Assistant Examiner* — Md Haque
(74) *Attorney, Agent, or Firm* — Sughrue Mion, PLLC

(57) ABSTRACT

A method and apparatus for providing a three-dimensional (3D) image is provided. In the method, first-viewpoint image data and second-viewpoint image data that provide a 3D image are obtained. Time information that represents points of time that the first-viewpoint image data and the second-viewpoint image data are to be processed is produced, based on relation information to indicate that the first-viewpoint image data and the second-viewpoint image data are a pair of pieces of image data. The first-viewpoint image data, the second-viewpoint image data, and the time information are transmitted. The first-viewpoint image data is transmitted in a first stream, and the second-viewpoint image data is transmitted in a second stream.

28 Claims, 16 Drawing Sheets

FIG. 5

| SYNTAX | BIT |
| --- | --- |
| Stereoscopic_dual_sequence_descriptor () { | |
| descriptor_tag | bit (8) |
| descriptor_length | bit (8) |
| reserved | bit (6) |
| PTS_composition_type (510) | bit (1) |
| LR_flag (520) | bit (1) |
| if (PTS_composition_type =0) { | |
| Reserved | bit (3) |
| L_display_first_flag (530) | bit (1) |
| }else if (PTS_composition_type=1 ) { | |
| Reserved | bit (3) |
| L_procede_R_flag (540) | bit (1) |
| } | |
| } | |

FIG. 6

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i = 0; i < N; i++) { | | |
|         descriptor()  (610) | | |
|     } | | |
|     for(i = 0; i < N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i = 0; i < N2; i++) { | | |
|             descriptor() | | |
|         } | | |
|     } | | |
|     CRC_32 | 32 | rpchof |
| } | | |

FIG. 8

| video_sequence() { | No. of bits | Mnemonic |
|---|---|---|
| next_start_code() | | |
| sequence_header() | | |
| if ( nextbits() = = extension_start_code ) { | | |
| sequence_extension() | | |
| do { | | |
| extension_and_user_data( 0 )   (810) | | |
| do { | | |
| if ( nextbits() = = group_start_code) { | | |
| group_of_pictures_header() | | |
| extension_and_user_data( 1 )   (820) | | |
| } | | |
| picture_header() | | |
| picture_coding_extension() | | |
| extensions_and_user_data( 2 )   (830) | | |
| picture_data() | | |
| } while ( (nextbits () = = picture_start_code)｜｜ | | |
| (nextbits () = = group_start_code) ) | | |
| if ( nextbits() != sequence_end_code ) { | | |
| sequence_header() | | |
| sequence_extension() | | |
| } | | |
| } while ( (nextbits () != sequence_end_code ) | | |
| } else { | | |
| /*ISO/IEC 11172_2*/ | | |
| } | | |
| sequence_end_code | 32 | bslbf |
| } | | |

METHOD AND APPARATUS FOR PROVIDING AND PROCESSING 3D IMAGE

CROSS-REFERENCE TO RELATED PATENT APPLICATION

This application claims priority from Korean Patent Application No. 10-2010-0098829, filed on Oct. 11, 2010 in the Korean Intellectual Property Office, the disclosure of which is incorporated herein by reference.

BACKGROUND

1. Field

Apparatuses and methods consistent with the exemplary embodiments relate to providing and processing a three-dimensional (3D) image, and more particularly, to providing a 3D image by providing pair information regarding image data based on time information, and processing a 3D image by using time information that provides pair information regarding image data.

2. Description of the Related Art 3D images are produced based on a binocular parallax of an observer's eyes. In particular, a 3D image is produced by separately generating image data to be viewed with the left eye of the observer and image data to be viewed with the right eye of the observer. Thus, a stereoscopic effect can be achieved.

In the related art, techniques of multiplexing and transmitting a plurality of pieces of image data obtained at different viewpoints have been used because a network situation may vary or the speed of information processing is limited. In view of related art networking and information processing technologies, related art techniques of transmitting a plurality of pieces of image data obtained at different viewpoints, in separate streams have developed. In this related art scheme, information indicating that the plurality of pieces of image data are a pair of pieces of image data that are related to each other is required.

SUMMARY

One or more exemplary embodiments provide a 3D image providing method and apparatus for providing pair information by using time information, and a 3D image processing method and apparatus for processing a 3D image by using time information that provides pair information.

According to an exemplary embodiment, there is provided a method of providing a 3D image, the method including obtaining first-viewpoint image data and second-viewpoint image data that provide a 3D image together; producing time information that represents points of time that the first-viewpoint image data and the second-viewpoint image data are to be processed, based on relation information, to indicate that the first-viewpoint image data and the second-viewpoint image data are a pair of pieces of image data; and transmitting the first-viewpoint image data, the second-viewpoint image data, and the time information, wherein the transmitting of the first-viewpoint image data, the second-viewpoint image data, and the time information include transmitting the first-viewpoint image data in a first stream and the second-viewpoint image data in a second stream.

The time information may include at least one from among a decoding time stamp (DTS) and a presentation time stamp (PTS).

The producing of the time information may include producing time information regarding the first-viewpoint image data and the second-viewpoint image data, according to a first mode or a second mode, wherein the first mode represents that pieces of time information allocated to a pair of pieces of image data that provide a 3D image have the same value, and the second mode represents that pieces of time information allocated to a pair of image data that provide a 3D image have consecutive values.

The producing of the time information may include additional information containing type information regarding the time information.

If the time information is produced based on the first mode, the additional information may further include priority order information that represents an order in which a pair of pieces of image data each having the same time information are to be processed.

If the time information is produced based on the second mode, the additional information may further include preceding time-point information that represents whether first time information of the first-viewpoint image data is earlier than second time information of the second-viewpoint image data or the second time information is earlier than the second time.

The additional information may further include 3D mode information that represents that the first-viewpoint image data and the second-viewpoint image data provide the 3D image and are transmitted in different streams, respectively.

The additional information may be included in a program mapping table (PMT).

The additional information may be included in at least one from among a private data field and an extension field included in a header of a program elementary stream (PES).

The additional information may be included in a 'User_data' field included in a header of an elementary stream (ES).

The additional information may be included in at least one from among a supplemental enhancement information (SEI) field, a sequence parameter set (SPS) field, and a picture parameter set (PPS) field according to the H.264 standard.

According to another exemplary embodiment, there is provided a method of processing a 3D image, the method including receiving a first stream containing first-viewpoint image data that provides a 3D image and a second stream containing second-viewpoint image data that provides the 3D image; obtaining time information indicating points of time that the first-viewpoint image data and the second-viewpoint image data are to be processed; and processing the first-viewpoint image data and the second-viewpoint image data, based on the time information, wherein the time information is produced based on relation information so as to indicate that the first-viewpoint image data and the second-viewpoint image data are a pair of pieces of image data.

If a situation that causes image data contained in at least one from among the first stream and the second stream to be discontinuously processed occurs, the processing of the first-viewpoint image data and the second-viewpoint image data may include controlling the image data in the first stream and the image data in the second stream not to be output until reference image data referring to no image data is detected from both the first stream and the second stream.

If reference image data referring to no image data is detected from both the first stream and the second stream, the processing of the first-viewpoint image data and the second-viewpoint image data may further include outputting the image data in the first stream and the image data in the second stream to be synchronized with each other, starting from reference image data detected later from among the detected reference image data, based on the additional information.

The processing of the first-viewpoint image data and the second-viewpoint image data may further include transmitting information needed for the synchronization to at least one from among a post-processor and a renderer.

The processing of the first-viewpoint image data and the second-viewpoint image data may further include inserting information needed for the synchronization into the image data in the first stream and the image data in the second stream that are to be output.

The foregoing situation may include a signal requesting random accessing being received or frame skipping occurring.

According to another exemplary embodiment, there is provided an apparatus for providing a 3D image, the apparatus including a receiving unit for receiving first-viewpoint image data and second-viewpoint image data that provide a 3D image together; a production unit for producing time information that represents points of time that the first-viewpoint image data and the second-viewpoint image data are to be processed, based on relation information, so as to indicate that the first-viewpoint image data and the second-viewpoint image data are a pair of pieces of image data; and a transmission unit for transmitting the first-viewpoint image data, the second-viewpoint image data, and the time information, wherein the transmission unit transmits the first-viewpoint image data and the second-viewpoint image data in different streams, respectively.

According to another exemplary embodiment, there is provided an apparatus for processing a 3D image, the apparatus including a receiving unit for receiving a first stream containing first-viewpoint image data that provides a 3D image and a second stream containing second-viewpoint image data that provides the 3D image; an obtaining unit for obtaining time information indicating points of time that the first-viewpoint image data and the second-viewpoint image data are to be processed; and a processor for processing the first-viewpoint image data and the second-viewpoint image data, based on the time information, wherein the time information is produced based on relation information to indicate that the first-viewpoint image data and the second-viewpoint image data are a pair of pieces of image data.

BRIEF DESCRIPTION OF THE DRAWINGS

The above and other aspects will become more apparent an more readily appreciated from the following description of the exemplary embodiments with reference to the accompanying drawings in which:

FIG. 5 illustrates the syntax of additional information, according to an exemplary embodiment;

FIG. 6 illustrates additional information added to a program mapping table (PMT), according to an exemplary embodiment;

FIG. 8 illustrates additional information added to a header of an elementary stream (ES), according to an exemplary embodiment;

DETAILED DESCRIPTION

Figure 1:
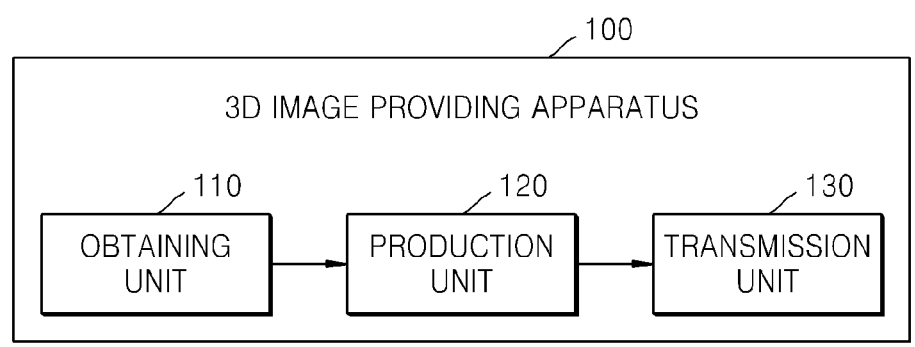
FIG. 1 is a block diagram of a 3D image providing apparatus according to an exemplary embodiment.

Below, exemplary embodiments will now be described in detail with reference to accompanying drawings so as to be realized by a person having ordinary knowledge in the art. The exemplary embodiments may be embodied in various forms without being limited to the exemplary embodiments set forth herein. Descriptions of well-known parts may be omitted for clarity, and like reference numerals refer to like elements throughout.

FIG. 1 is a block diagram of a 3D image providing apparatus 100 according to an exemplary embodiment. The 3D image providing apparatus 100 includes an obtaining unit 110, a production unit 120, and a transmission unit 130.

The obtaining unit 110 obtains image data that provides a 3D image. According to the exemplary embodiment, a 3D image is stereoscopic image data provided using image data obtained at two different viewpoints, but may be stereoscopic image data provided using image data obtained at three or more different viewpoints. A plurality of pieces of image data that provide a 3D image together will be hereinafter referred to as 'first-viewpoint image data' and 'second-viewpoint image data'. The first-viewpoint image data may be left-viewpoint image data and the second-viewpoint image data may be right-viewpoint image data, or vice versa. In some exemplary embodiments, the first-viewpoint image data and the second-viewpoint image data may be referred to as 'reference-viewpoint image data' and 'additional-viewpoint image data', respectively.

The obtaining unit 110 may receive the first-viewpoint image data and the second-viewpoint image data from the outside, or may directly produce them. The first-viewpoint image data and the second-viewpoint image data may be produced using a common coding technique, or may be produced using different coding techniques.

The production unit 120 produces time information indicating points of time that the first-viewpoint image data and the second-viewpoint image data are to be processed. The time information may include a decoding time stamp (DTS) indicating the points of time that the first-viewpoint image data and the second-viewpoint image data are to be processed by a decoder (not shown), or a presentation time stamp (PTS) indicating points of time that the first-viewpoint image data and the second-viewpoint image data are to be processed by a renderer (not shown).

The production unit 120 produces the time information so that a 3D image providing apparatus 200, which will be described below, may recognize a pair of pieces of image data, based on the time information. The produced time information may be transmitted while being contained in additional information regarding the first-viewpoint image data and the second-viewpoint image data.

Two methods of producing time information regarding a pair of pieces of image data by using the production unit 120, according to exemplary embodiments, will be described. However, the time information may be produced according to another method as would be understood by those skilled in the art, as long as the time information represents a pair of pieces of image data.

In a first exemplary method, time information is produced such that both of a pair of pieces of image data may be assigned the same time information value. The first exemplary method is described in detail with reference to FIG. 3.

Figure 3:
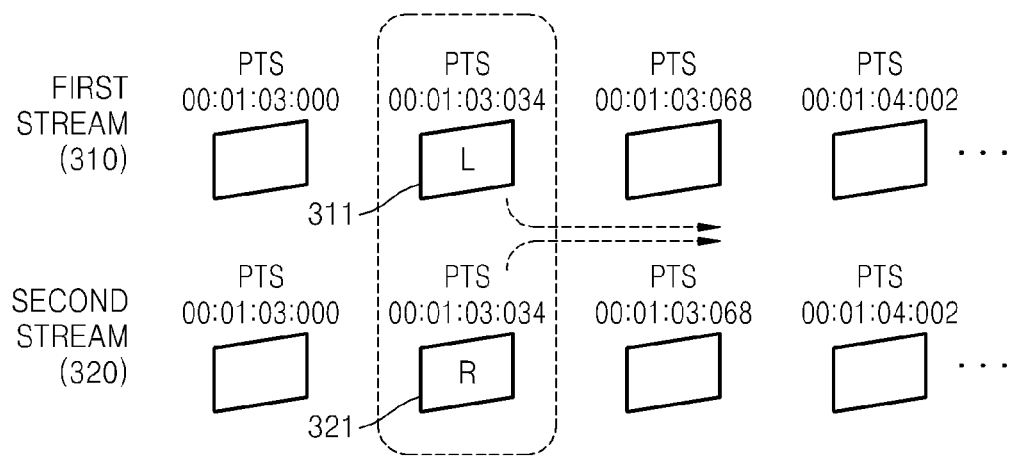
FIG. 3 illustrates time information produced by a production unit included in the 3D image providing apparatus of FIG. 1, according to an exemplary embodiment.

FIG. 3 illustrates time information produced by the production unit 120 included in the 3D image providing apparatus 100 of FIG. 1, according to an exemplary embodiment. A first stream 310 contains first-viewpoint image data and a second stream 320 contains second-viewpoint image data. The production unit 120 produces the same PTS to be assigned to a pair of first-viewpoint image data and second-viewpoint image data. Referring to FIG. 3, the production unit 120 produces '00:01:03:034' as a PTS to be assigned to both the first-viewpoint image data 311 and the second-viewpoint image data 321.

According to the first exemplary method, the 3D image processing apparatus 200 receives two or more pieces of image data having the same PTS. However, two pieces of data cannot be output at the same point of time. Thus, an order in which the two pieces of data are to be processed should be signaled. To this end, the production unit 120 may further produce priority order information indicating an order in which a pair of pieces of image data having the same time information are to be processed. The priority order information may be contained in additional information regarding the image data.

According to a second exemplary method, the production unit 120 produces time information regarding a pair of pieces of image data in such a manner that the pair of pieces of image data may be assigned consecutive time information values, respectively. The second exemplary method is described in detail with reference to FIG. 4.

Figure 4:
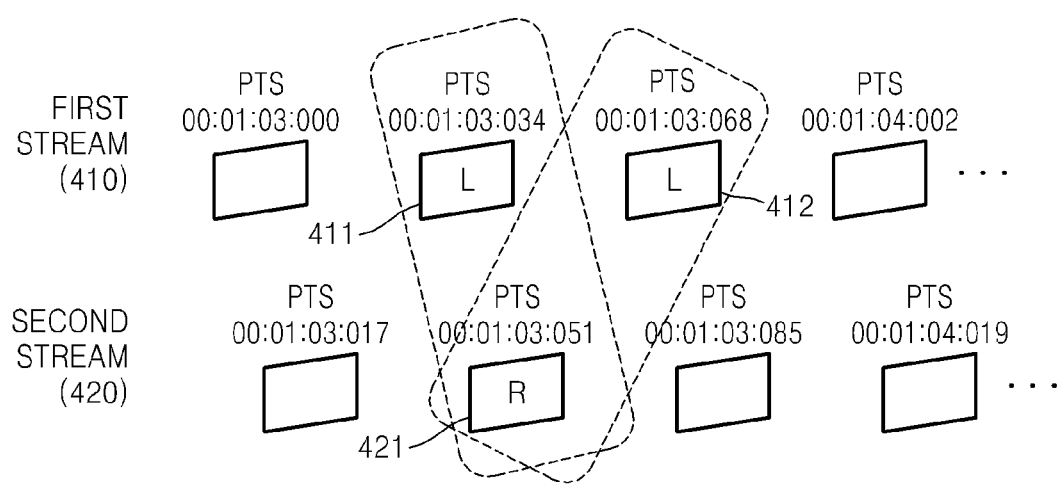
FIG. 4 illustrates time information produced by the production unit included in the 3D image providing apparatus of FIG. 1, according to another exemplary embodiment.

FIG. 4 illustrates time information produced by the production unit 120 included in the 3D image providing apparatus of FIG. 1, according to another exemplary embodiment. The production unit 120 produces consecutive PTSs to be assigned to a pair of first-viewpoint image data and second-viewpoint image data, respectively; however, the production unit 120 may alternatively produce non-consecutive time information values.

Referring to FIG. 4, a PTS assigned to first-viewpoint image data 411, a PTS assigned to first-viewpoint image data 412, and a PTS assigned to second-viewpoint image data 421 are set to '00:01:03:034', '00:01:03:068', and '00:01:03:051', respectively.

Since the first-viewpoint image data and the second-viewpoint image data to which the consecutive PSTs are assigned, respectively, are a pair of pieces of image data, either the first-viewpoint image data 411 and the second-viewpoint image data 421 or the first-viewpoint image data 412 and the second-viewpoint image data 421 may be a pair of pieces of image data. So that the consecutive PTSs may clearly represent the pair of pieces of image data, the production unit 120 may further produce preceding time-point information that represents whether first time information of the first-viewpoint image data is earlier than second time information of the second-viewpoint image data or that represents the second time information is earlier than the second time, and then may insert the preceding time-point information into additional information.

If the first-viewpoint image data has the preceding time information, then the first-viewpoint image data 411 and the second-viewpoint image data 421 are a pair of pieces of image data. If the first-viewpoint image data does not have the preceding time information, then the first-viewpoint image data 411 and the second-viewpoint image data 421 are a pair of pieces of image data.

The transmission unit 130 transmits the first-viewpoint image data, the second-viewpoint image data, and the time information. The transmission unit 130 transmits the first-viewpoint image data in a first stream, and the second-viewpoint image data in a second stream. That is, the transmission unit 130 transmits the first-viewpoint image data and the second-viewpoint image data in different streams. The time information may be transmitted by being added to corresponding image data or being contained in other information. In another exemplary embodiment, the time information may be transmitted via a transmission medium that is substantially different from a transmission medium for transmitting the first stream and the second stream.

The transmission unit 130 may transmit additional information that includes at least one of type information of the time information (i.e., information indicating the relationship between the pair of pieces of image data), priority order information, and the preceding time-point information.

If the image data is processed using an MPEG-based coding technique, the additional information may be added to at least one of a program mapping table (PMT), a header of a program elementary stream (PES), and a header of an elementary stream (ES). If the image data is processed using an H.264-based coding technique, the additional information may be added to at least one from among supplemental enhancement information (SEI), a sequence parameter set (SPS), and a picture parameter set (PPS).

Left-viewpoint image data and right-viewpoint image data need to be obtained to provide a 3D image. In the related art, left-viewpoint image data and right-viewpoint image data are multiplexed and transmitted in one stream, and thus, a pair of pieces of image data may be recognized.

However, according to various methods of transmitting left-viewpoint image data and right-viewpoint image data in separate streams, a pair of pieces of image data may be difficult to recognize. Also, left-viewpoint image data and right-viewpoint image data input to a display device may not be sequentially delivered, and in this case, a user would not appropriately experience a stereoscopic effect.

According to an exemplary embodiment, pair information regarding a pair of pieces of image data is provided by using time information, e.g., a PTS, thereby allowing the pair of pieces of image data to be recognized without requiring additional dummy data.

Figure 2:
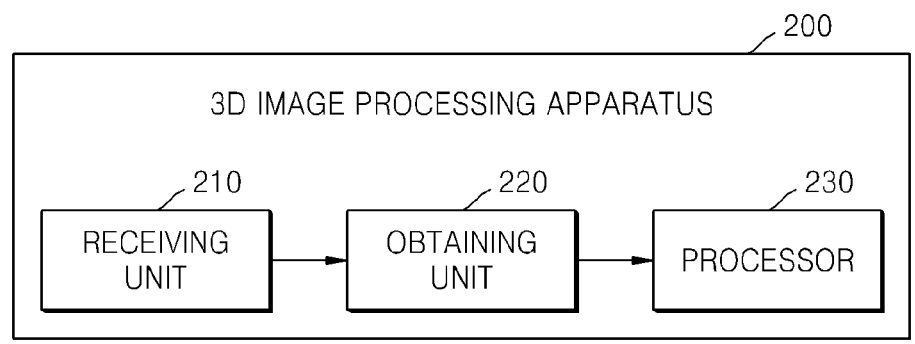
FIG. 2 is a block diagram of a 3D image processing apparatus according to an exemplary embodiment.

FIG. 2 is a block diagram of the 3D image processing apparatus 200 according to an exemplary embodiment. The 3D image processing apparatus 200 includes a receiving unit 210, an obtaining unit 220, and a processor 230.

The receiving unit 210 receives a plurality of streams providing a 3D image. Hereinafter, a stream containing first-viewpoint image data and a stream containing second-viewpoint image data are referred to as a 'first stream' and a 'second stream', respectively.

The obtaining unit 220 obtains time information representing points of time that first-viewpoint image data and second-viewpoint image data are to be processed, respectively. The obtaining unit 220 may further obtain additional information containing type information of the time information.

If a pair of pieces of image data are assigned the same time information (first type), then priority order information indicating for processing the pair of pieces of image data may be contained in the additional information. If the pair of pieces of image data are assigned a plurality pieces of consecutive time information, respectively (second type), then preceding time-point information indicating the image data having preceding time information from among the pair of pieces of image data may be contained in the additional information.

The processor 230 processes the first-viewpoint image data and the second-viewpoint image data based on the time information. Although not shown, the processor 230 may include a decoding unit and a renderer. Although not shown, the decoding unit may include a first decoder for decoding the first-viewpoint image data and a second decoder for decoding the second-viewpoint image data.

A method of processing image data based on time information by using the processor 230, according to an exemplary embodiment, will be described.

First, a case where a pair of first-viewpoint image data and second-viewpoint image data are assigned the same PTS (first type) will be described with reference to FIG. 3.

The first decoder decodes the first-viewpoint image data 311 and the second decoder decodes the second-viewpoint image data 321.

The first decoder and the second decoder check whether the first-viewpoint image data 311 and the second-viewpoint image data 321 are a pair of pieces of image data, based on type information and PTSs assigned thereto. The decoding unit may signal pair information and temporal relation information of the pair of pieces of image data to the renderer.

The renderer performs rendering on the first-viewpoint image data 311 and the second-viewpoint image data 321 to be synchronized with each other. In this case, since the first-viewpoint image data 311 and the second-viewpoint image data 321 are assigned the same PTS, the renderer determines whether the first-viewpoint image data 311 or the second-viewpoint image data 321 is to be first rendered, based on the priority order information as described above. For example, if the priority order information indicates that the first-viewpoint image data 311 is given priority over the second-viewpoint image data 321, the first-viewpoint image data 311 is first rendered, and then, the second-viewpoint image data 321 is rendered.

A case where a pair of first-viewpoint image data and second-viewpoint image data are assigned consecutive PTSs, respectively (second type) will be described with reference to FIG. 4 as follows.

The first decoder decodes the first-viewpoint image data 411 and 412, and the second decoder decodes the second-viewpoint image data 421.

The renderer determines whether the first-viewpoint image data 411 and the second-viewpoint image data 421 is a pair of pieces of image data, based on type information and preceding time-point information contained in additional information and PTSs assigned to the first-viewpoint image data 411 and the second-viewpoint image data 421. Then, the renderer performs rendering on the first-viewpoint image data 411 and the second-viewpoint image data 421 to be synchronized with each other.

FIG. 5 illustrates the syntax of additional information, according to an exemplary embodiment. A 'PTS_composition_type' field 510 indicates the types of PTSs assigned to a pair of pieces of image data. In this exemplary embodiment, a pair of pieces of image data are assigned the same PTS (first type) or are assigned consecutive PTSs, respectively (second type). When the 'PTS_composition_type' field 510 is set to '0', the PTSs assigned to the pair of pieces of image data correspond to the second type, and when the 'PTS_composition_type' field 510 is set to '1', the PTSs assigned to the pair of pieces of image data correspond to the first type.

An 'LR_flag' field 520 indicates viewpoints of a plurality of pieces of image data included in a plurality of streams, respectively. For example, if the 'LR_flag' field 520 is set to '1', a first stream may contain left-viewpoint image data, and if the 'LR_flag' field 520 is set to '0', the first stream may contain right-viewpoint image data.

An 'L_procede_R_flag' field 540 represents preceding time-point information. If the PTSs assigned to the pair of pieces of image data correspond to the second type, the assigned PTSs are consecutive PTSs. In this case, the pair of pieces of image data may be identified by indicating whether the PTS assigned to the left-viewpoint image data or the PTS assigned to the right-viewpoint image data is a preceding PTS.

If the 'L_procede_R_flag' field 540 is set to '1', it means that the PTS assigned to the left-viewpoint image data precedes the PTS assigned to the right-viewpoint image data. If the 'L_procede_R_flag' field 540 is set to '0', it means that the PTS assigned to the right-viewpoint image data precedes the PTS assigned to the left-viewpoint image data.

An 'L_display_first_flag' field 530 represents priority order information. If the PTSs assigned to the pair of pieces of image data correspond to the first type, the assigned PTSs are the same. The 'L_display_first_flag' field 530 indicates whether the left-viewpoint image data or the right-viewpoint image data is to be first processed from among the pair of pieces of image data assigned the same PTS.

If the 'L_display_first_flag' field 530 is set to '1', it means that the left-viewpoint image data is to be processed before the right-viewpoint image data. If the 'L_display_first_flag' field 530 is set to '0', it means that the right-viewpoint image data is to be processed before the left-viewpoint image data.

FIG. 6 illustrates a case where additional information is added to a PMT, according to an exemplary embodiment. The additional information may be provided in a 'reserved' field or a 'descriptor' field of program signaling information (PSI). Referring to FIG. 6, the additional information is included in a 'descriptor' field 610 of the PMT.

Figure 7:
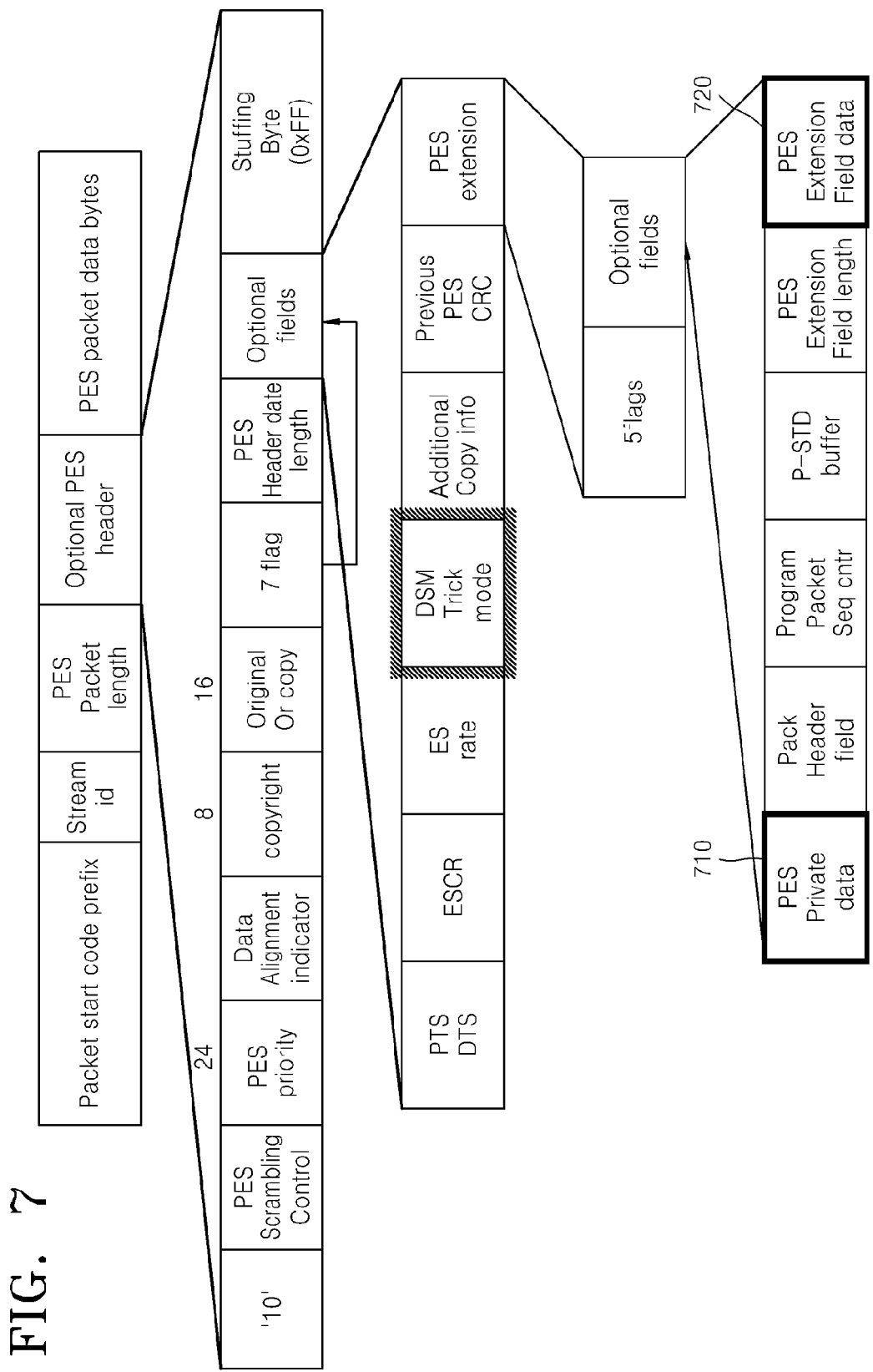
FIG. 7 illustrates additional information added to a header of a program elementary stream (PES), according to an exemplary embodiment.

FIG. 7 illustrates a case where additional information is added to a header of a PES, according to an exemplary embodiment. The additional information may be included in at least one of a 'PES_private_data' field 710 or a 'PES_Extention_Field_data' field 720.

FIG. 8 illustrates a case where additional information is added to a header of an ES, according to an exemplary embodiment. The additional information may be included in at least one from among an 'extension_and_user_data(0)' field 810, an 'extension_and_user_data (1)' field 820, and an 'extensions_and_user_data (2)' field 830.

Figure 9:
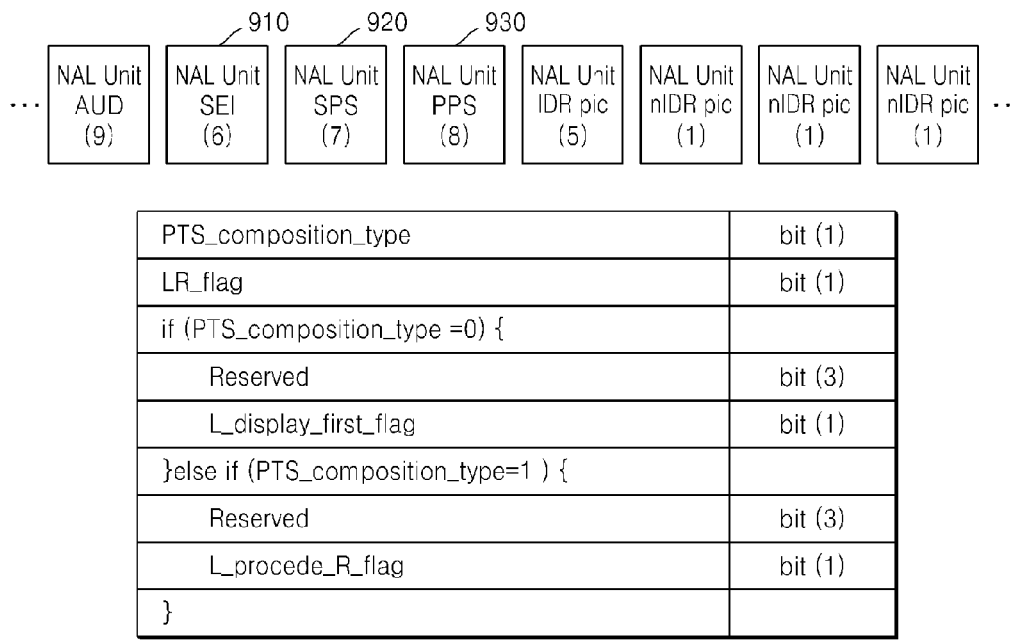
FIG. 9 illustrates additional information added to a network abstraction layer (NAL) unit defined in the H.264 standard, according to an exemplary embodiment.

FIG. 9 illustrates a case where additional information is added to a network abstraction layer (NAL) unit defined in the H.264 standard, according to an exemplary embodiment. The additional information may be included in at least one from among supplemental enhancement information (SEI) 910, a sequence parameter set (SPS) 920, and a picture parameter set (PPS) 930. The SEI 910 is a region, in which the additional information is provided. The SEI 910 may contain content defined by a user. The SPS 920 denotes header information containing information related to encoding and decoding of sequences.

The PPS 930 denotes header containing pictures.

Figure 10:
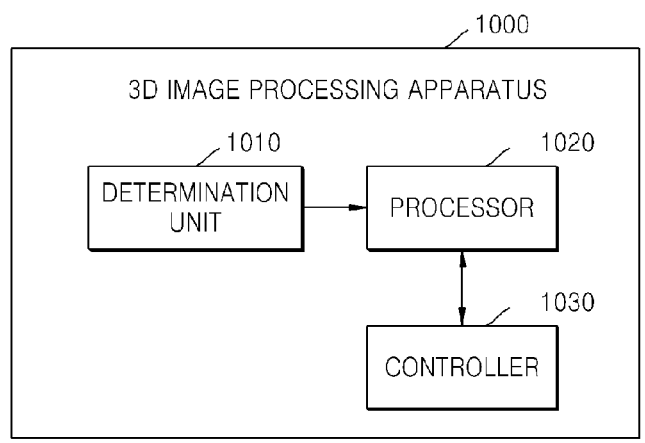
FIG. 10 is a block diagram of a 3D image processing apparatus according to an exemplary embodiment.

FIG. 10 is a block diagram of a 3D image processing apparatus 1000 according to another exemplary embodiment. The 3D image processing apparatus 1000 includes a determination unit 1010, a processor 1020, and a controller 1030.

The determination unit 1010 determines whether a situation that causes image data contained in one of a first stream and a second stream to be processed discontinuously occurs. The first stream and the second stream contain first-viewpoint image data and second-viewpoint image data, which provide a 3D image together, respectively. Examples of such a situation include a case where random accessing is required, e.g., when a user requests trick play or fast play-back, and a case where outputting of a decoder is delayed, a renderer cannot receive data, or frame skipping occurs due to overflow of a buffer.

The determination unit 1010 informs the controller 1030 that the situation occurs. The processor 1020 decodes the image data contained in the first stream and the second stream and transmits the decoding result to a renderer (not shown). The processor 1020 is capable of identifying a pair of pieces of image data and determining an order in which the pair of pieces of image data are to be output, based on additional information specifying the type of time information and temporal relation between the pair of pieces of image data. Thus, the processor 1020 may sequentially output the first-viewpoint image data and the second-viewpoint image data to be synchronized with each other. However, when a situation that prevents the image data contained in the first and second streams from being sequentially reproduced occurs, the first-viewpoint image data and the second-viewpoint image data should be sequentially output synchronously under the control of the controller 1030, as described in detail below.

The controller 1030 controls the processor 1020 such that the first-viewpoint image data and the second-viewpoint image data are reproduced synchronously.

The controller 1030 controls the processor 1020 so that when this situation occurs, the image data cannot be transmitted to the renderer until reference image data that refers to no image data is detected from both the first stream and the second stream. The reference image data may be an I-frame or an instantaneous decoder refresh (IDR) frame.

The reference image data may be randomly accessed. To provide a 3D image, the first-viewpoint image data and the second-viewpoint image data should be output synchronously. Thus, the 3D image may be reproduced, starting from points of time that reference image data corresponding to the first-viewpoint image data and reference image data corresponding to the second-viewpoint image data are detected. Accordingly, the controller 1030 checks the type of image data processed by the processor 1020, and prevents the processed image data from being delivered to the renderer until reference image data corresponding to the first-viewpoint image data and reference image data corresponding to the second-viewpoint image data are detected.

If reference image data is detected from both the first and second streams, then the controller 1030 controls the processor 1020 such that a plurality of pieces of image data may be rendered to be synchronized with each other, starting from the reference image data detected later from among the detected reference image data. The controller 1030 may control the processor 1020 in such a manner that synchronization information, e.g., pair information, which is required to render the plurality of pieces of image data to be synchronized with each other, may be transmitted to the renderer.

The processor 1020 may add the synchronization information to the image data and transmit the resultant image data to the renderer or a post-processor (not shown), or may transmit the synchronization information to the renderer or the post-processor separately from the image data, under the control of the controller 1030.

Figure 11:
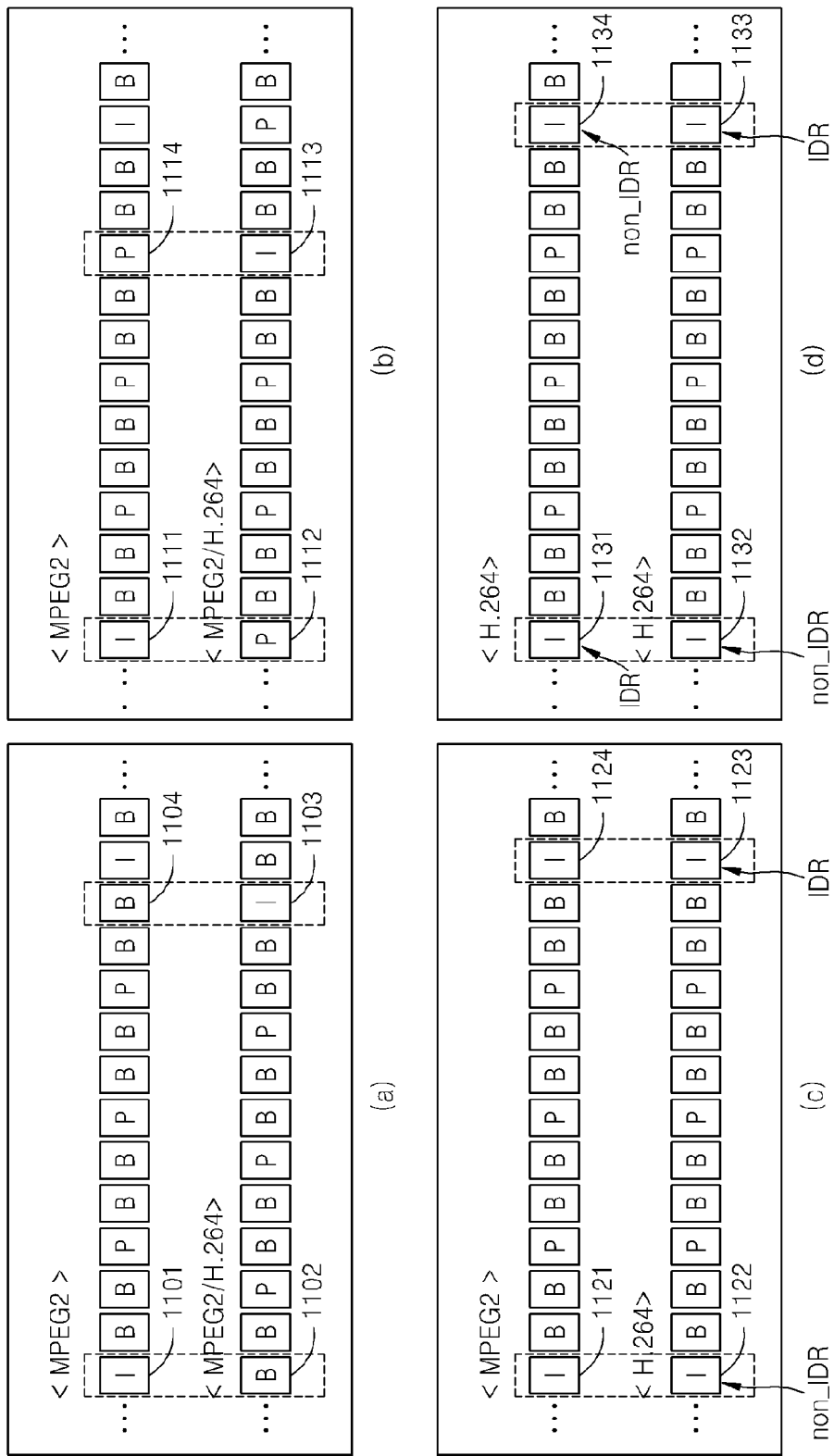
FIG. 11 illustrates a method of randomly accessing by the 3D image processing apparatus of FIG. 10, according to an exemplary embodiment.

FIG. 11 illustrates a method of performing random accessing by the 3D image processing apparatus 1000 of FIG. 10, according to an exemplary embodiment. A first stream contains left-viewpoint image data and a second stream contains right-viewpoint image data.

Referring to (a) of FIG. 11, a first stream has been produced using the MPEG2 coding technique and a second stream has been reproduced using the MPEG2 or H.264 coding technique.

Points in the first and second streams, which may be randomly accessed, will be described. In the first stream, an I-frame 1101 may be randomly accessed. However, image data contained in the second frame, which corresponds to the I-frame 1101 in the first stream, is a B-frame 1102. The I-frame 1101 is reference image data that can be decoded without having to refer to another image data; however the B-frame 1102 should be decoded by referring to another image data. Thus, in the second stream, the B-frame 1102 cannot be randomly accessed.

The controller 1030 does not render image data in the first stream and image data in the second stream until reference image data is detected from the second stream. When an I-frame 1103 is detected from in the second stream, the controller 1030 controls the processor 1020 to render the plurality of pieces of image data to be synchronized with one another, starting from the I-frame 1103. Then, the left-viewpoint image data and the right-viewpoint image data may be sequentially rendered, starting from a B-frame 1104 in the first stream and the I-frame 1103 in the second stream.

As described above, the controller 1030 may control the image data in the first stream and the image data in the second stream to be output synchronously by delaying output of decoded image data in the first stream and counting the number of pieces of image data delayed until the image data in the first stream and the image data in the second stream can be output simultaneously, based on additional information.

Referring to (b) of FIG. 11, a first stream has been produced using the MPEG2 coding technique and a second stream has been produced using the MPEG2 or H.264 coding technique.

Points in the first and second streams, which may be randomly accessed, will be described. In the first stream, an I-frame 1111 may be randomly accessed. However, image data contained in the second frame, which corresponds to the I-frame 1111 in the first stream, is a P-frame 1112. The P-frame 1112 should be decoded by referring to another image data, similar to the B-frame 1102, and thus cannot be randomly accessed.

The controller 1030 controls both image data in the first stream and image data in the second stream not to be rendered until reference image data is detected from the second stream. When an I-frame 1113 is detected from the second frame, the controller 1030 controls the processor 1020 so as to render the plurality of pieces of image data to be synchronized with one another, starting from the I-frame 1113. Then, left-viewpoint image data and right-viewpoint image data may be sequentially rendered, starting from a P-frame 1114 in the first stream and the I-frame 1113 in the second frame.

Referring to (c) of FIG. 11, a first stream has been produced using the MPEG2 coding technique, and a second stream has been produced using the H.264 coding technique.

Points in the first and second streams, which may be randomly accessed, will be described. In the first stream, an I-frame 1121 may be randomly accessed. Image data in the second frame, which corresponds to the I-frame 1121 in the first frame, is also an I-frame 1122. In the H.264 coding technique, an IDR frame can be decoded without having to refer to another image data from among a plurality of I-frames. The IDR frame means a frame that can be decoded without having to refer to any previous frame information, and all of a picture order count (PIC), a frame number, and a state of a reference frame buffer may be initialized based on the IDR frame. In the H.264/AVC coding technique, a P-frame subsequent to an I-frame may be prediction-encoded by referring to frames prior to the I-frame. Thus, the I-frame 1122 cannot be a random access point.

The I-frame 1122 is not an IDR frame, and thus, right-viewpoint image data cannot be reproduced at a point of time that random accessing is requested.

The controller 1030 controls both image data in the first stream and image data in the second stream not to be rendered until reference image data is detected from the second frame. If an IDR frame 1123 is detected from the second stream, the controller 1030 controls the processor 1020 to render the plurality of pieces of image data to be synchronized with one another, starting from the IDR frame 1123. Then, left-viewpoint image data and right-viewpoint image data may be sequentially rendered, starting from an I-frame 1124 in the first stream and the IDR frame 1123 in the second stream.

Referring to (d) of FIG. 11, both a first stream and a second stream have been produced using the H.264 coding technique.

Points in the first and second stream, which may be randomly accessed, will be described. In the first stream, an IDR frame 1131 may be randomly accessed but image data in the second frame, which corresponds to the IDR frame 1131 in the first stream, is an I-frame 1132, not an IDR frame. Since the I-frame 1132 is not an IDR frame, right-viewpoint image data cannot be reproduced at a point of time that random accessing is requested. Thus, in the second stream, the I-frame 1132 cannot be randomly accessed.

The controller 1030 controls both image data in the first stream and image data in the second stream not to be rendered until reference image data is detected from the second stream. If an IDR frame 1133 is detected from the second stream, the controller 1030 controls the processor 1020 to render the plurality of pieces of image data to be synchronized with one another, starting from the IDR frame 1123. Then, left-viewpoint image data and right-viewpoint image data may be sequentially rendered, starting from an IDR frame 1134 in the first stream and the IDR frame 1133 in the second stream.

Figure 12:
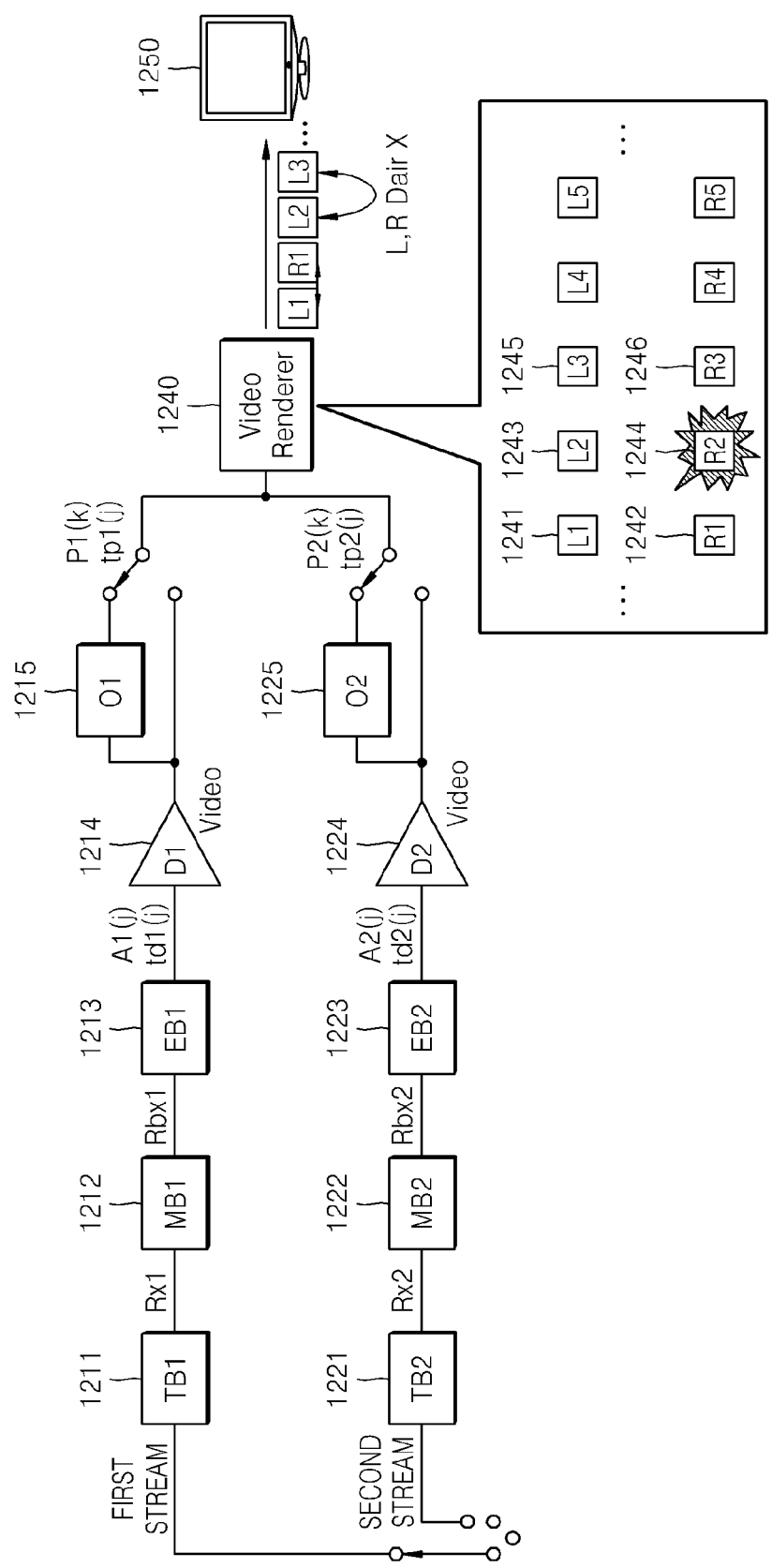
FIG. 12 illustrates frame skipping in the 3D image processing apparatus of FIG. 10, according to an exemplary embodiment.

FIG. 12 illustrates a case where frame skipping occurs in the 3D image processing apparatus 1000 of FIG. 10, according to an exemplary embodiment. A first stream contains left-viewpoint image data and a second stream contains right-viewpoint image data. A TB1 1211 and a TB2 1221 denote a transmission buffer for the first stream and a transmission buffer for a second stream, respectively. A program clock reference (PCR) may be obtained via the TB1 1211 or the TB2 1221. The PCR is a time stamp contained in a transmission stream and designates a decoding timing.

MB1 1212 and MB2 1222 denote a multiplexing buffer for the first stream and a multiplexing buffer for a second stream, respectively. A DTS or a PTS may be obtained via the MB1 1212 or the MB2 1222. The PTS may be present in a header of a PES and represents presentation time. The DTS may be present in a header of a PES and represents decoding time.

EB1 1213 and EB2 1223 denote a basic stream buffer for the first stream and a basic stream buffer for a second stream, respectively.

D1 1214 and D2 1224 denote a decoder for the first stream and a decoder for a second stream, respectively.

O1 1215 and O2 1225 denote a rearrangement buffer for the first stream and a rearrangement buffer for a second stream, respectively.

Referring to FIG. 12, right-viewpoint image data R2 1244 was not processed due to overflow of a buffer included in a video renderer 1240. Thus, the video renderer 1240 sequentially performs rendering on left-viewpoint image data L1 1241, right-viewpoint image data R1 1242, left-viewpoint image data L2 1243, and left-viewpoint image data L3 1245. Since both the left-viewpoint image data L2 1243 and the left-viewpoint image data L3 1245 are left-viewpoint image data, they are not a pair of pieces of image data, and would thus not produce a stereoscopic effect.

According to an exemplary embodiment, when frame skipping occurs, rendering is stopped until a reference image frame is detected from both the first stream and the second stream. Thus, even if frame skipping occurs, left-viewpoint image data and right-viewpoint image data may be output synchronously.

Figure 13:
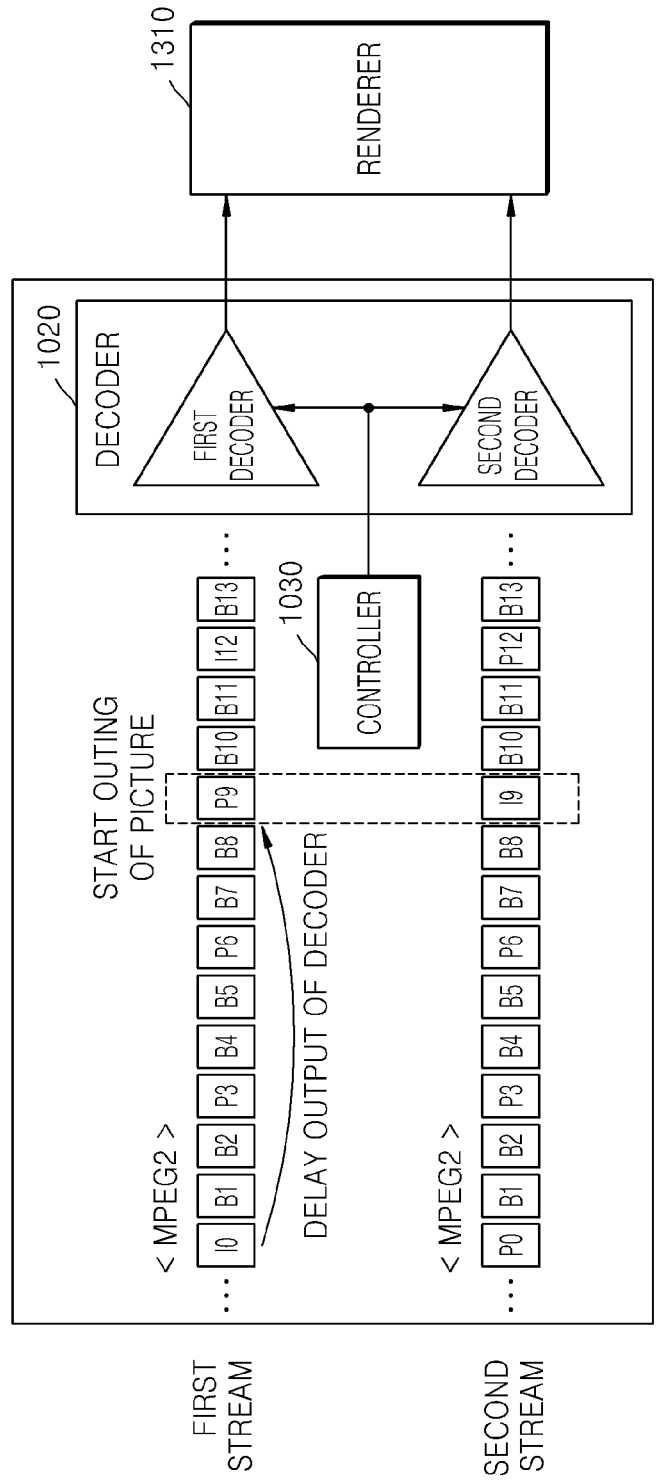
FIG. 13 is a block diagram schematically illustrating an operation of the 3D image processing apparatus of FIG. 10, according to an exemplary embodiment.

FIG. 13 is a block diagram schematically illustrating an operation of the 3D image processing apparatus 1000 of FIG. 10, according to an exemplary embodiment. In FIG. 13, a user requests trick play.

The controller 1030 determines whether a plurality of pieces of image data at a point of time that trick play is requested are reference image data. Image data in a second frame at this point of time is a P-frame, and thus, the controller 1030 controls the processor 1020 not to transmit the image data to the renderer 1310.

When an I-frame is detected from the second frame, the controller 1030 controls the processor 1020 to output the plurality of pieces of image data to be synchronized with one another, starting from the detected I-frame.

Figure 14:
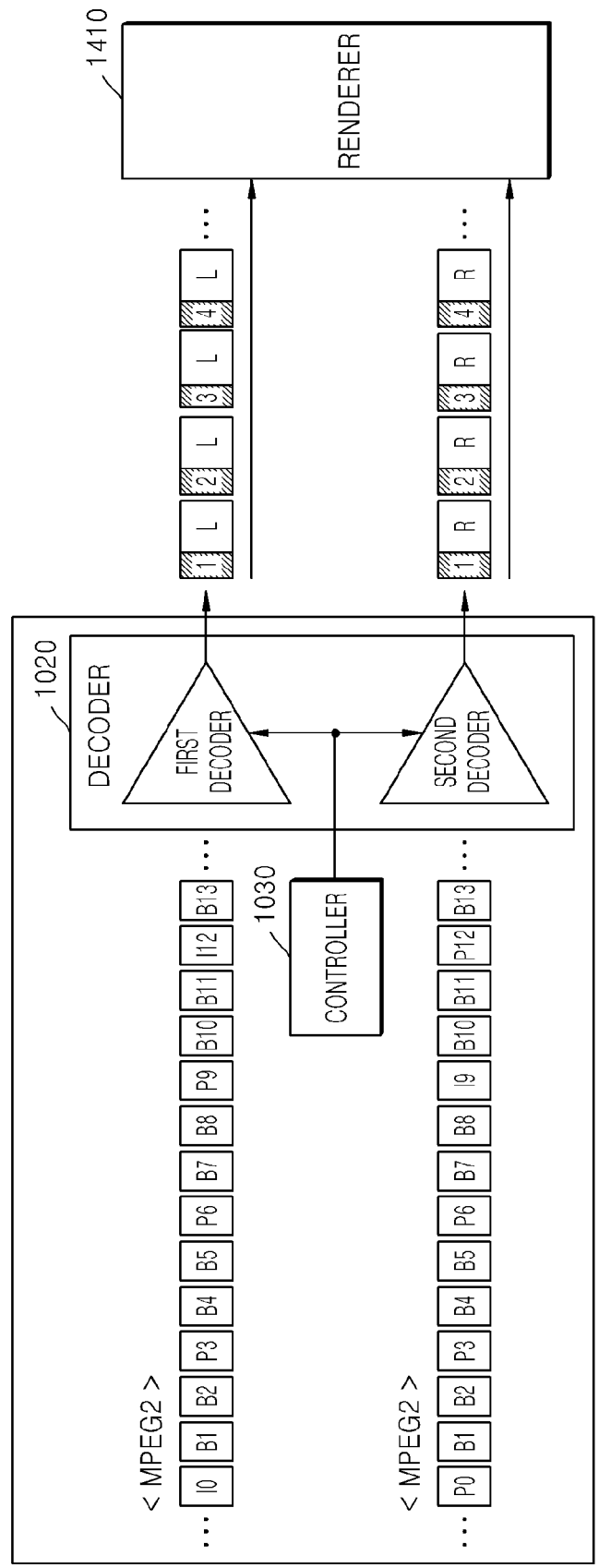
FIG. 14 illustrates a method of transmitting synchronization information from the 3D image processing apparatus of FIG. 10, according to an exemplary embodiment.

FIG. 14 illustrates a method of delivering synchronization information from the 3D image processing apparatus 1000 of FIG. 10, according to an exemplary embodiment. The processor 1020 adds synchronization information (e.g., 1, 2, 3, 4) to left-viewpoint image data and right-viewpoint image data, and transmits the left-viewpoint image data and the right-viewpoint image data to a renderer 1410. The synchronization information may contain a pair of pieces of information for identifying a pair of pieces of image data, and output order information that represents an order in which the pair of image information are to be output.

Figure 15:
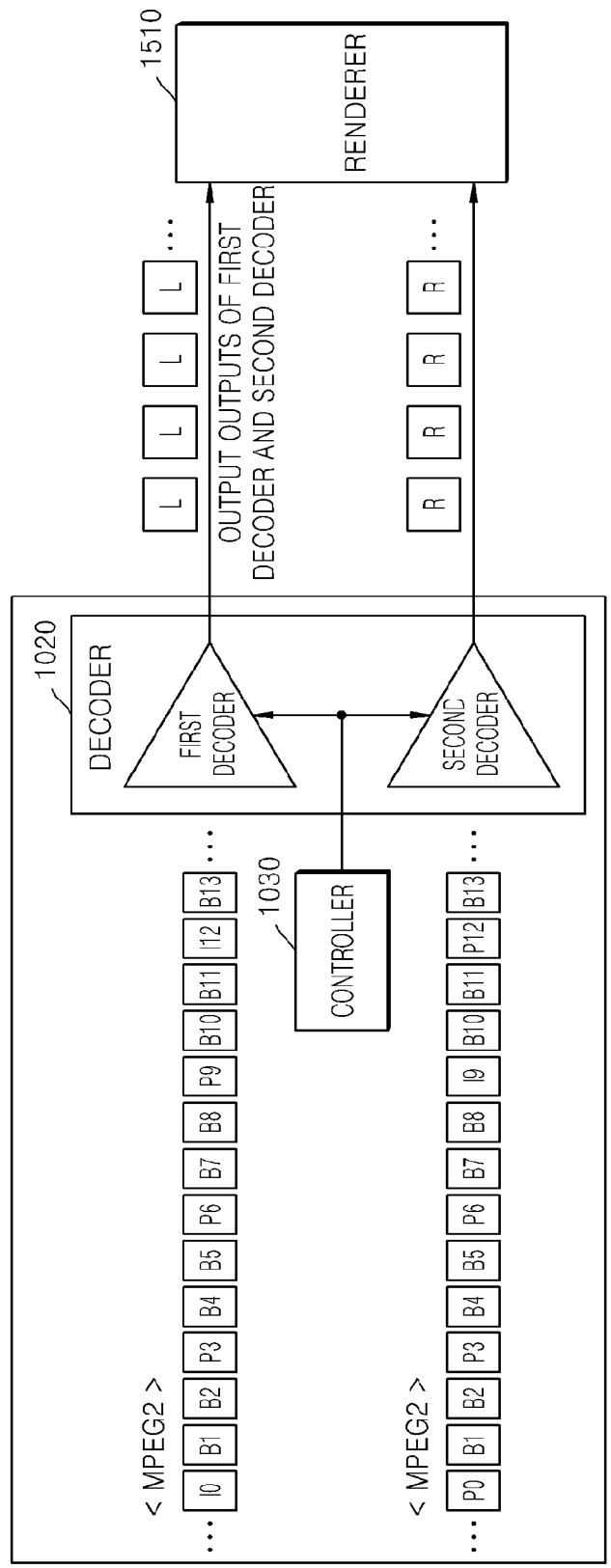
FIG. 15 illustrates a method of transmitting synchronization information from the 3D image processing apparatus of FIG. 10, according to another exemplary embodiment.

FIG. 15 illustrates a method of delivering synchronization information from the 3D image processing apparatus 1000 of FIG. 10, according to another exemplary embodiment. The processor 1020 transmits the synchronization information to a renderer 1510, separately from a plurality of pieces of decoded image data.

Figure 16:
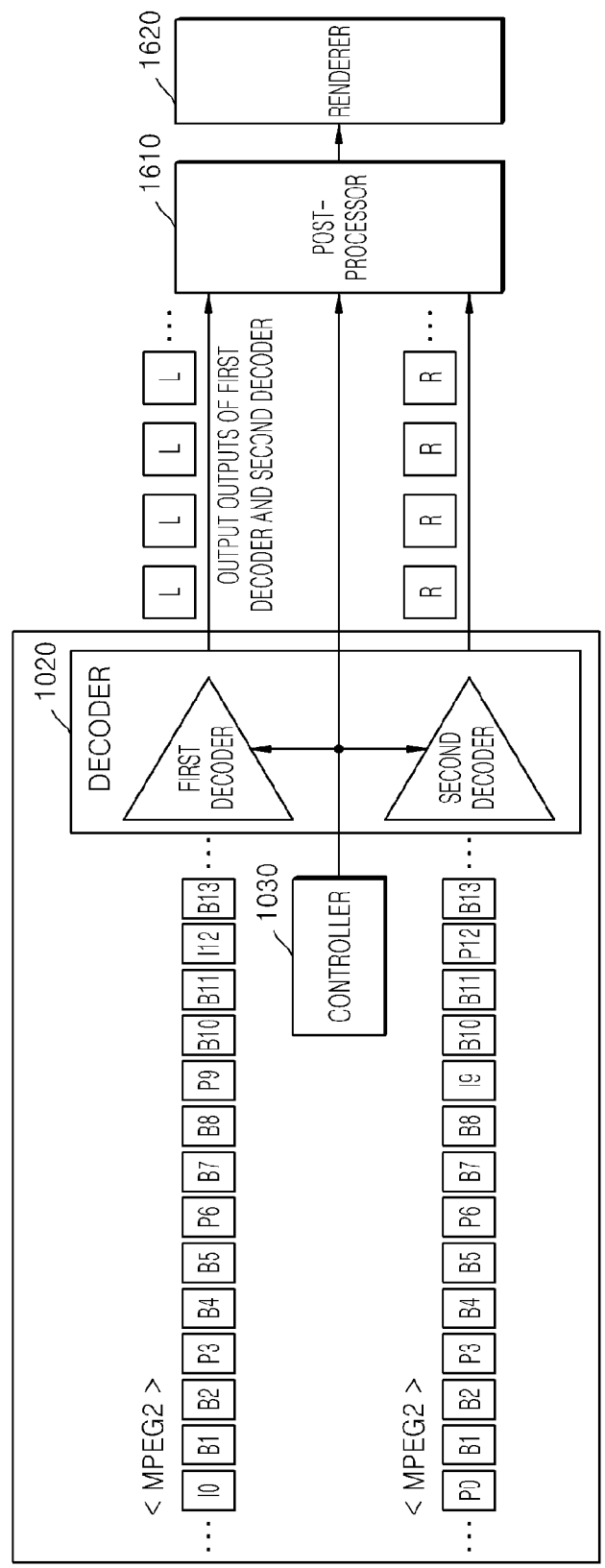
FIG. 16 illustrates a method of transmitting synchronization information from the 3D image processing apparatus of FIG. 10, according to another exemplary embodiment.

FIG. 16 illustrates a method of delivering synchronization information from the 3D image processing apparatus 1000 of FIG. 10, according to another exemplary embodiment. The processor 1020 transmits the synchronization information to a post-processor 1610 and a renderer 1620, separately from a plurality of pieces of decoded image data.

Figure 17:
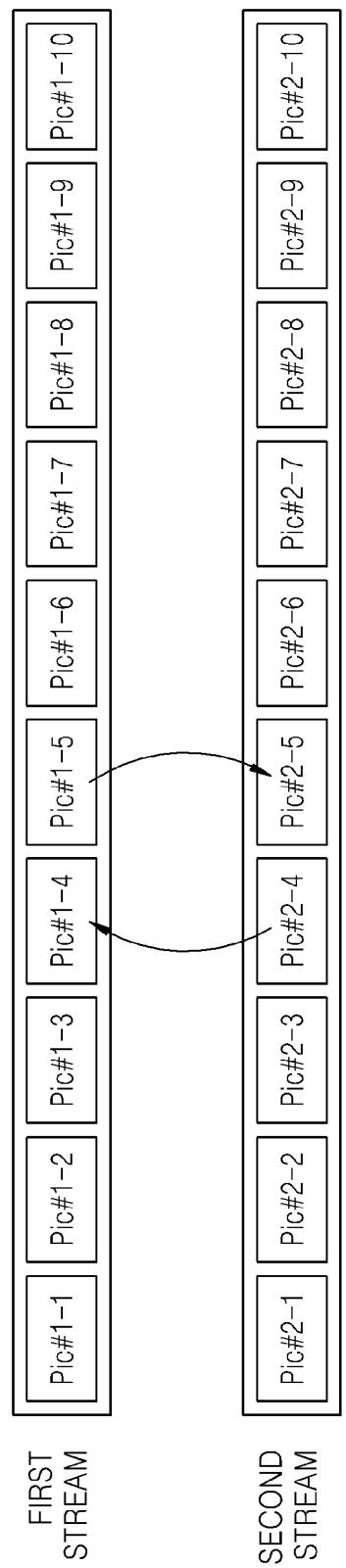
FIG. 17 illustrates a method of performing synchronization by the 3D image processing apparatus 1000 of FIG. 10, according to an exemplary embodiment.

FIG. 17 illustrates a method of performing synchronization by using data other than additional information by the 3D image processing apparatus 1000 of FIG. 10, according to an exemplary embodiment. A first stream has been produced using the MPEG2 coding technique, and a second stream has been produced using the H.264/AVC coding technique.

In the MPEG2 coding technique, a sequence of frames is defined in a 'temporal reference' field, and an order of frame display is determined in units of group of pictures (GOPs).

In the H.264/AVC coding technique, a sequence of frames is defined using a Picture Order Count (POC)) that represents an order of frame display. The POC is calculated using one of three ways according to 'pic_order_cnt_type' defined in a slice header, based on information for calculating a count, included in the slice header.

Thus, the 3D image processing apparatus 1000 may learn ranks of a plurality of pieces of image data in a stream by obtaining a 'temporal reference' field by decoding left-viewpoint image data and calculating the POC by decoding right-viewpoint image data. A pair of pieces of image data may be identified by using such information.

As described above, the 3D image processing apparatus 1000 may identify a pair of pieces of image data not only by using time information, such as a PTS or a DTS, but also by using information, such as a 'temporal reference' field or a POC.

Figure 18:
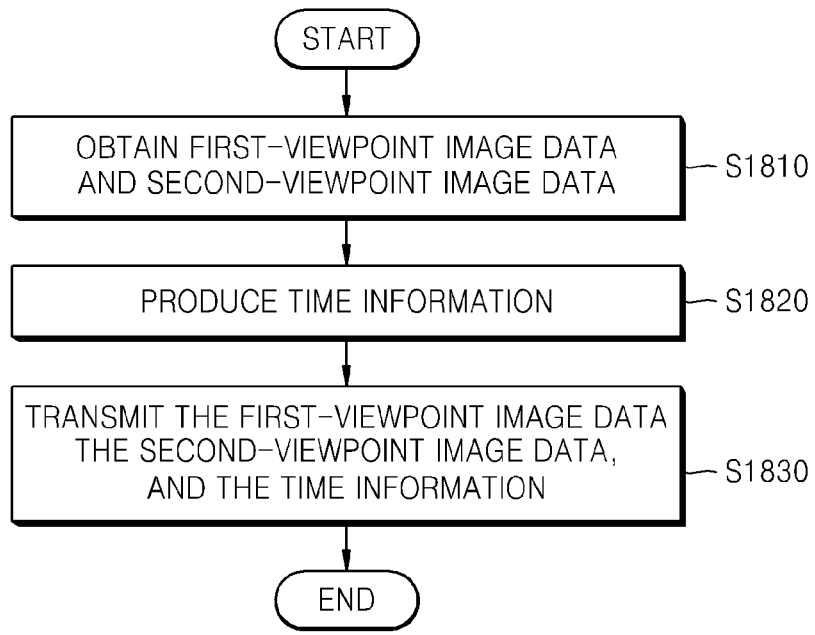
FIG. 18 is a flowchart illustrating a method of providing a 3D image, according to an exemplary embodiment.

FIG. 18 is a flowchart illustrating a method of providing a 3D image, according to an exemplary embodiment. In operation S1810, first-viewpoint image data and second-viewpoint image data that provide a 3D image are obtained.

In operation S1820, time information that represents points of time that the first-viewpoint image data and the second-viewpoint image data are to be processed, is produced. In this case, the time information is produced based on relation information to indicate that the first-viewpoint image data and the second-viewpoint image data are a pair of pieces of image data.

In operation S1830, the first-viewpoint image data, the second-viewpoint image data, and the time information are transmitted. For example but not by way of limitation, the first-viewpoint image data is transmitted in a first stream, and the second-viewpoint image data is transmitted in a second stream.

Figure 19:
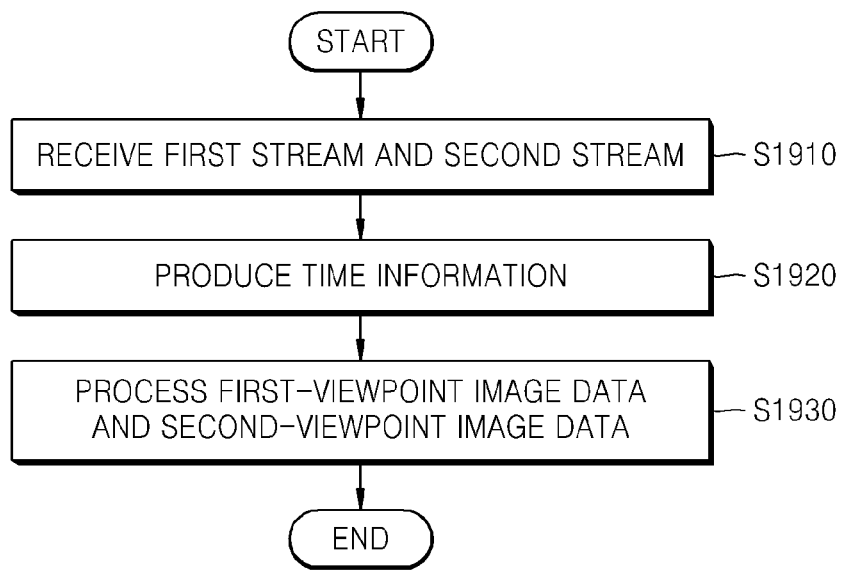
FIG. 19 is a flowchart illustrating a method of processing a 3D image, according to an exemplary embodiment.

FIG. 19 is a flowchart illustrating a method of processing a 3D image, according to an exemplary embodiment. In operation S1910, a first stream containing first-viewpoint image data that provides a 3D image, and a second stream containing second-viewpoint image data that also provides the 3D image are received.

In operation S1920, time information, which represents points of time that the first-viewpoint image data and the second-viewpoint image data are to be processed, is obtained. The time information is produced based on relation information to indicate that the first-viewpoint image data and the second-viewpoint image data are a pair of pieces of image data.

In operation S1930, the first-viewpoint image data and the second-viewpoint image data are processed based on the time information.

Figure 20:
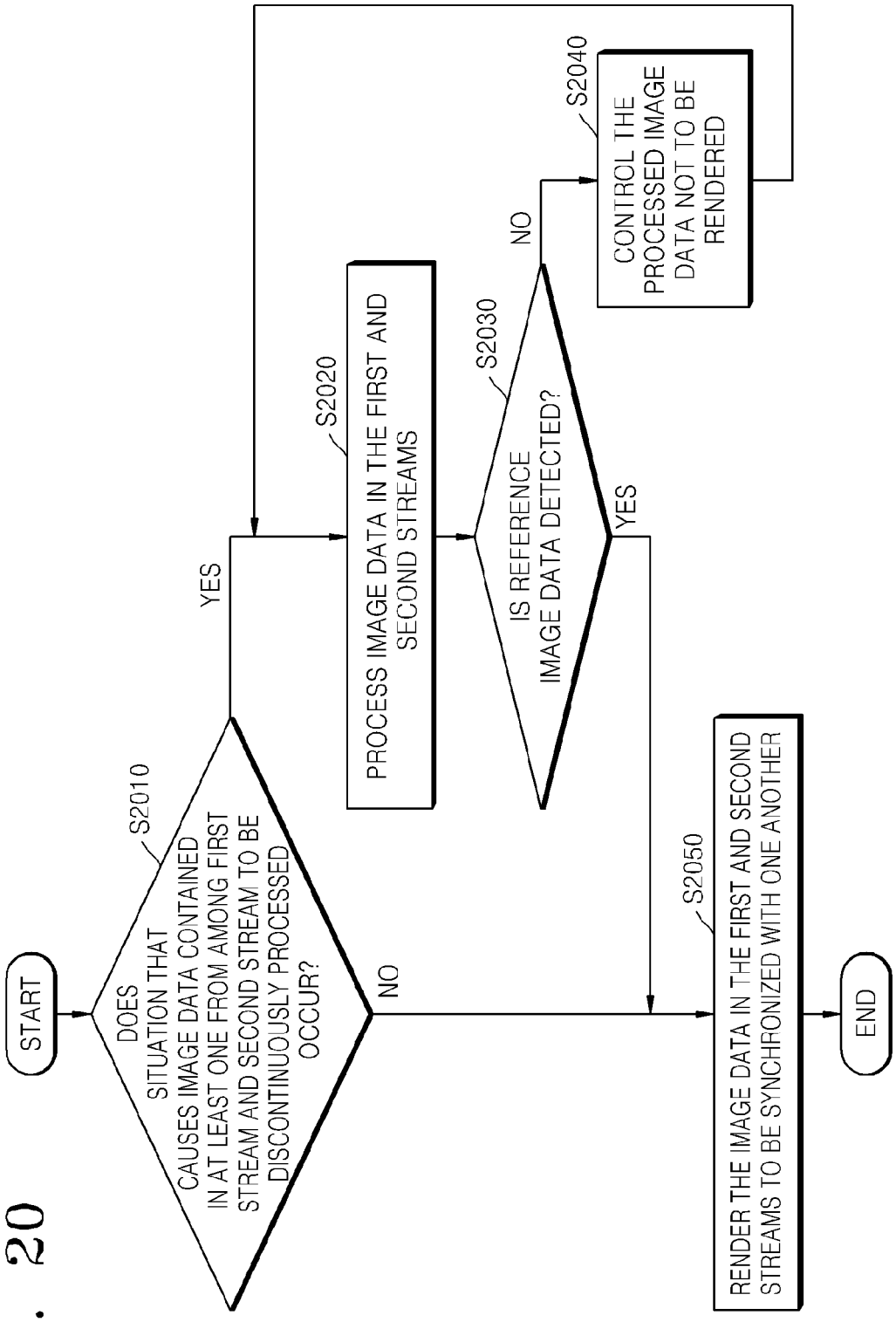
FIG. 20 is a flowchart illustrating a method of processing a 3D image, according to another exemplary embodiment.

FIG. 20 is a flowchart illustrating a method of processing a 3D image, according to another exemplary embodiment. In operation S2010, it is determined whether a situation that causes image data contained in at least one from among a first stream and a second stream to be discontinuously processed occurs. If it is determined that this situation occurs, operation S2020 is performed; otherwise, operation S2050 is performed as explained below.

In operation S2020, the image data in the first stream and the image data in the second stream are processed.

In operation S2030, it is determined whether reference image data referring to no image data is detected from both the first stream and the second stream. That is, after operation S2010 is performed, it is determined whether reference image data is detected from both the first stream and the second stream. If reference image data is detected from both the first stream and the second stream, operation S2050 is performed; otherwise, operation S2040 is performed.

In operation S2040, the processed image data is controlled not to be rendered. Then, operation S2020 is performed again so as to process subsequent image data.

In operation S2050, the plurality of pieces of image data are rendered to be synchronized with one another, thereby providing the 3D image.

The above exemplary embodiments may be embodied as a computer program. The computer program may be stored in a computer readable recording medium, and executed using a hardware processor or a general digital computer. Examples of the computer readable medium include a magnetic recording medium (a ROM, a floppy disc, a hard disc, etc.), and an optical recording medium (a CD-ROM, a DVD, etc.).

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims.

What is claimed is:

1. A method of providing a three-dimensional (3D) image performed by a 3D image providing apparatus including at least one processor, the method comprising:

obtaining first-viewpoint image data of first-viewpoint images and second-viewpoint image data of second-viewpoint images;

producing relation information indicating relation between a pair of a first-viewpoint image and a second-viewpoint image to compose a 3D image;

producing time information that represents when the first-viewpoint image data and the second-viewpoint image data, corresponding to the first-viewpoint images and the second-viewpoint images, respectively, are to be processed, and represents, in connection with the relation information, which pair of the first-viewpoint image data and the second-viewpoint image data, among a sequence of pairs of first-viewpoint image data and second-viewpoint image data, corresponds to the pair of the first-viewpoint image and the second-viewpoint image; and transmitting the first-viewpoint image data, the second-viewpoint image data, and the time information, wherein the first-viewpoint image data is transmitted in a first stream and the second-viewpoint image data is transmitted in a second stream, wherein the time information comprises type information which is determined according to whether a time value for processing the first-viewpoint image data and a time value for processing the second-viewpoint image data is same or not, wherein the producing the time information comprises producing time information regarding the first-viewpoint image data and the second-viewpoint image data, according to a first type or a second type, and wherein the first type represents that pieces of time information allocated to a pair of pieces of image data that provide the 3D image have a common value, and the second type represents that pieces of time information allocated to the pair of image data that provides the 3D image have non-common values.

2. The method of claim 1, wherein the time information comprises at least one of a decoding time stamp (DTS) and a presentation time stamp (PTS).

3. The method of claim al, wherein the producing the time information further comprises providing additional information containing type information regarding the time information.

4. The method of claim 3, wherein, if the time information corresponds to the first type, the additional information further comprises priority order information that represents a processing order for a pair of pieces of image data each having common time information.

5. The method of claim 3, wherein, if the time information corresponds to the second type, the additional information further comprises preceding time-point information that represents whether first time information of the first-viewpoint image data is earlier than second time information of the second-viewpoint image data.

6. The method of claim 3, wherein the additional information further comprises 3D mode information that represents that the first-viewpoint image data and the second-viewpoint image data provide the 3D image and are transmitted in different streams, respectively.

7. The method of claim 3, wherein the additional information is included in a program mapping table (PMT).

8. The method of claim 3, wherein the additional information comprises at least one of a private data field and an extension field included in a header of a program elementary stream (PES).

9. The method of claim 3, wherein the additional information is included in a 'User_data' field included in a header of an elementary stream (ES).

10. The method of claim 3, wherein the additional information is included in at least one of a supplemental enhancement information (SEI) field, a sequence parameter set (SPS) field, and a picture parameter set (PPS) field according to the H.264 standard.

11. A method of processing a three-dimensional (3D) image performed by a 3D image processing apparatus including at least one processor, the method comprising:

receiving a first stream containing first-viewpoint image data and a second stream containing second-viewpoint image data;

obtaining relation information indicating relation between a pair of a first-viewpoint image and a second-viewpoint image to compose a 3D image;

obtaining time information that indicates when the first-viewpoint image data and the second-viewpoint image data, corresponding to the first-viewpoint images and the second-viewpoint images, respectively, are to be processed and represents, in connection with the relation information, which pair of the first-viewpoint image data and the second-viewpoint image data, among a sequence of pairs of first-viewpoint image data and second-viewpoint image data, corresponds to the pair of a first-viewpoint image and a second-viewpoint image; and processing the first-viewpoint image data and the second-viewpoint image data to render the pair of the first-viewpoint image and the second-viewpoint image, based on the time information and the relation information, wherein the time information comprises type information which is determined according to whether a time value for processing the first-viewpoint image data and a time value for processing the second-viewpoint image data is same or not, and wherein the time information corresponds to a first type or a second type, wherein the first type represents that pieces of time information allocated to a pair of pieces image data that provide the 3D image have a common value, and the second type represents that pieces time information allocated to a pair of pieces of image data that provide a 3D image have non-common values.

12. The method of claim 11, wherein the time information comprises at least one of a decoding time stamp (DTS) and a presentation time stamp (PTS).

13. The method of claim 11, wherein the obtaining the time information comprises obtaining additional information containing type information regarding the time information, and the processing comprises processing the first-viewpoint image data and the second-viewpoint image data, based on the time information and the additional information.

14. The method of claim 13, wherein, if the time information corresponds to the first type, the additional information further comprises priority order information that represents an order in which the pair of pieces of image data each having common time information are to be processed.

15. The method of claim 13, wherein, if the time information corresponds to the second type, the additional information further comprises preceding time-point information that represents whether first time information of the first-viewpoint image data is earlier than second time information of the second-viewpoint image data.

16. The method of claim 13, wherein the additional information is included in a program mapping table (PMT).

17. The method of claim 13, wherein the additional information comprises at least one of a private data field and an extension field included in a header of a program elementary stream (PES).

18. The method of claim 13, wherein the additional information is included in a 'User_data' field included in a header of an elementary stream (ES).

19. The method of claim 13, wherein the additional information is included in at least one of a supplemental enhancement information (SEI) field, a sequence parameter set (SPS) field, and a picture parameter set (PPS) field according to the H.264 standard.

20. The method of claim 13, wherein, if image data contained in at least one of the first stream and the second stream is discontinuously processed, the processing comprises controlling the image data in the first stream and the image data in the second stream not to be output until reference image data referring to no image data is detected from the first stream and the second stream.

21. The method of claim 20, wherein, if reference image data referring to no image data is detected from the first stream and the second stream, the processing further comprises outputting the image data in the first stream and the image data in the second stream to be synchronized with each other, starting from reference image data detected later from among the detected reference image data, based on the additional information.

22. The method of claim 21, wherein the processing further comprises transmitting synchronization information, which is required to output the image data in the first stream and the image data in the second stream to be synchronized with each other, to at least one from among a post-processor and a renderer.

23. The method of claim 21, wherein the processing further comprises inserting synchronization information, which is required to output the image data in the first stream and the image data in the second stream to be synchronized with each other, into the image data in the first stream and the image data in the second stream that are to be output.

24. The method of claim 20, wherein the discontinuously processed image data occurs when a signal requesting random accessing is received or frame skipping occurs.

25. An apparatus for providing a three-dimensional (3D) image, the apparatus comprising:
a receiving unit that receives first-viewpoint image data of first-viewpoint images and second-viewpoint image data of second-viewpoint images;
a production unit that produces relation information indicating relation between a pair of a first-viewpoint image and a second-viewpoint image to compose a 3D image, produces time information that represents when the first-viewpoint image data and the second-viewpoint image data, corresponding to the first-viewpoint images and the second-viewpoint images, respectively, are to be processed, and represents, in connection with the relation information, which pair of the first-viewpoint image data and the second-viewpoint image data, among a sequence of pairs of first-viewpoint image data and second-viewpoint image data, corresponds to the pair of the first-viewpoint image and the second-viewpoint image; and
a transmission unit that transmits the first-viewpoint image data, the second-viewpoint image data, and the time information,
wherein the transmission unit transmits the first-viewpoint image data and the second-viewpoint image data in different streams, respectively,
wherein the time information comprises type information which is determined according to whether a time value for processing the first-viewpoint image data and a time value for processing the second-viewpoint image data is same or not, wherein the producing unit produces time information regarding the first-viewpoint image data and the second-viewpoint image data, according to a first type or a second type, and
wherein the first type represents that pieces of time information allocated to a pair of pieces of image data that provide the 3D image have a common value, and the second type represents that pieces of time information allocated to the pair of image data that provides the 3D image have non-common values.

26. An apparatus for processing a three-dimensional (3D) image, the apparatus comprising:
a receiving unit that receives a first stream containing first-viewpoint image data and a second stream containing second-viewpoint image data;
an obtaining unit that obtains relation information indicating relation between a pair of a first-viewpoint image and a second-viewpoint image to compose a 3D image, obtains time information indicating when the first-viewpoint image data and the second-viewpoint image data, corresponding to the first-viewpoint images and the second-viewpoint images, respectively, are to be processed and represents, in connection with the relation information, which pair of the first-viewpoint image data and the second-viewpoint image data, among a sequence of pairs of first-viewpoint image data and second-viewpoint image data, corresponds to the pair of a first-viewpoint image and a second-viewpoint image; and
a processor that processes the first-viewpoint image data and the second-viewpoint image data to render the pair of the first-viewpoint image and the second-viewpoint image, based on the time information and the relation information,
wherein the time information comprises type information which is determined according to whether a time value for processing the first-viewpoint image data and a time value for processing the second-viewpoint image data is same or not, and
wherein the time information corresponds to a first type or a second type, wherein the first type represents that pieces of time information allocated to a pair of pieces image data that provide the 3D image have a common value, and the second type represents that pieces of time information allocated to a pair of pieces of image data that provide a 3D image have non-common values.

27. A non-transitory computer readable recording medium having recorded thereon a program which when executed by a computer performs the method of claim 1.

28. A non-transitory computer readable recording medium having recorded thereon a program which when executed by a computer performs the method of claim 12.

* * * * *